United States Patent [19]

Hay et al.

[11] 4,375,530

[45] Mar. 1, 1983

[54] POLYESTER OF 2,6-NAPHTHALENE DICARBOXYLIC ACID, 2,6-DIHYDROXY NAPHTHALENE, TEREPHTHALIC ACID, AND HYDROQUINONE CAPABLE OF FORMING AN ANISOTROPIC MELT

[75] Inventors: Ian L. Hay, Warren; Anthony J. East, Madison; Gordon W. Calundann, North Plainfield, all of N.J.

[73] Assignee: Celanese Corporation, New York, N.Y.

[21] Appl. No.: 395,372

[22] Filed: Jul. 6, 1982

[51] Int. Cl.³ .............................................. C08G 63/18
[52] U.S. Cl. ..................................... 524/605; 524/599; 524/601; 528/190; 528/193; 528/194; 528/271
[58] Field of Search ............... 528/190, 271, 193, 194; 524/599, 601, 605

[56] References Cited

U.S. PATENT DOCUMENTS

| | | | |
|---|---|---|---|
| 3,935,166 | 1/1976 | Kanai et al. | 528/190 |
| 4,067,852 | 1/1978 | Calundann | 528/190 |
| 4,153,779 | 5/1979 | Jackson, Jr. et al. | 528/190 |
| 4,169,933 | 10/1979 | Jackson, Jr. et al. | 528/190 |
| 4,184,996 | 1/1980 | Calundann | 528/190 |
| 4,256,624 | 3/1981 | Calundann | 528/190 |
| 4,318,841 | 3/1982 | East et al. | 528/190 |
| 4,318,842 | 3/1982 | East et al. | 528/190 |
| 4,330,457 | 5/1982 | East et al. | 528/190 |
| 4,337,190 | 6/1982 | Calundann | 528/190 |

*Primary Examiner*—Lester L. Lee
*Attorney, Agent, or Firm*—Burns, Doane, Swecker & Mathis

[57] ABSTRACT

A novel wholly aromatic polyester is provided which contains specified concentrations of recurring 2,6-dicarboxynaphthalene moiety, 2,6-dioxynaphthalene moiety, terephthaloyl moiety, and 1,4-dioxybenzene moiety. It has been found that such polyester is capable of exhibiting an anisotropic melt phase which is readily melt processable to form quality fibers, films, molded articles, etc. The absence in the polymer chain of moieties derived from hydroxy acids has been found to yield a highly linear more extended polymer chain along the polyester which contributes to the stiffness characteristics of shaped articles comprising the same.

18 Claims, No Drawings

POLYESTER OF 2,6-NAPHTHALENE DICARBOXYLIC ACID, 2,6-DIHYDROXY NAPHTHALENE, TEREPHTHALIC ACID, AND HYDROQUINONE CAPABLE OF FORMING AN ANISOTROPIC MELT

BACKGROUND OF THE INVENTION

Wholly aromatic polyester resins have long been known. For instance, 4-hydroxybenzoic acid homopolymer and copolymers have been provided in the past and are commercially available. Such polymers commonly are crystalline in nature, relatively high melting or possess a decomposition temperature which is below the melting point, and when molten frequently exhibit an isotropic melt phase. Molding techniques such as compression molding or sintering may be utilized with such materials. Representative publications which discuss these wholly aromatic polyesters include: (a) *Polyesters of Hydroxybenzoic Acids,* by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (August 1974), (c) *Aromatic Polyester Plastics,* by S. G. Cottis, Modern Plastics, Pages 62 and 63 (July 1975), and (d) *Poly(p-Oxybenzoyl Systems): Homopolymer for Coatings: Copolymers for Compression and Injection Molding,* by Roger S. Storm and Steve G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,662,052; 3,668,300; 3,723,388; 3,759,870; 3,767,621; 3,773,858; 3,787,370; 3,790,528; 3,829,406; 3,857,814; 3,884,876; 3,890,256; 3,974,250; and 3,975,487; and U.K. patent application No. 2,058,102A.

It has been disclosed that certain polyesters may be formed which exhibit melt anisotropy. See, for instance, (a) *Polyester X7G-A Self Reinforced Thermoplastic,* by W. J. Jackson, Jr., H. F. Kuhfuss, and T. F. Gray, Jr. 30th Anniversary Technical Conference, 1975 Reinforced Plastics Composites Institute, The Society of the Plastics Industry, Inc., Section 17-D, Pages 1-4, (b) Belgian Pat. Nos. 838,935 and 828,936, (c) Dutch Pat. No. 7505551, (d) West German Pat. Nos. 2520819, 2520820, 2722120, 2834535, 2834536 and 2834537, (e) Japanese Pat. Nos. 43-223; 2132-116; 3017-692; and 3021-293; (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,272,625; 4,279,803; 4,285,852; 4,287,332; 4,294,955; 4,299,756; 4,314,073; 4,318,841; and 4,318,842; and (g) U.K. application No. 2,002,404.

Representative disclosures of anisotropic melt forming polyesters or poly(ester-amides) which may include 2,6-dicarboxynaphthalene moiety and/or 2,6-dioxynaphthalene moiety are present in U.S. Pat. Nos. 4,067,852; 4,083,829; 4,093,595; 4,118,372; 4,130,545; 4,156,070; 4,169,933; 4,181,792; 4,184,966; 4,188,476; 4,201,856; 4,242,496; 4,247,514; 4,294,955, and commonly assigned U.S. Ser. Nos. 270,439, filed June 4, 1981 (now U.S. Pat. No. 4,339,375), and 270,440, filed June 4, 1981 (now U.S. Pat. No. 4,355,134). Also, U.K. patent application No. 2,058,102A discloses the use in ovenware of a broadly defined class of polyesters which may include dicarboxynaphthalene moiety and/or dioxynaphthalene moiety of unspecified symmetry.

It is an object of the present invention to provide a novel polyester which is capable of forming an optically anisotropic melt phase, and which may readily be melt processed to form quality fibers, films, three-dimensional molded articles, etc.

It is an object of the present invention to provide a novel polyester capable of forming an optically anisotropic melt phase which is derived from a specific combination of aromatic diols and aromatic diacids which are each free of ring substitution.

It is an object of the present invention to provide a novel polyester capable of forming an optically anisotropic melt phase which possesses a highly linear polymer chain which contributes to the stiffness characteristics of shaped articles comprising the same.

It is an object of the present invention to provide a novel polyester capable of forming an optically anisotropic melt phase which is derived from specified moieties in the absence of moieties derived from hydroxy acids which would impart different bond angles to the polymer chain.

These and other objects, as well as the scope, nature, and utilization of the claimed invention will be apparent to those skilled in the art from the following detailed description and appended claims.

SUMMARY OF THE INVENTION

It has been found that a melt processable polyester capable of forming an anisotropic melt phase at a temperature below approximately 350° C. consists essentially of the recurring moieties I, II, III, and IV which are free of ring substitution wherein:

I is 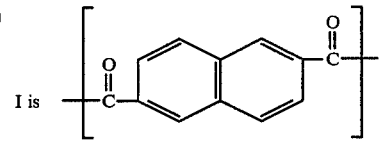,

II is 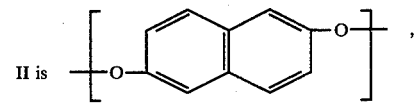,

III is 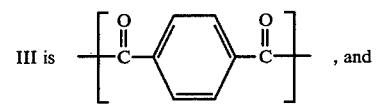, and

IV is 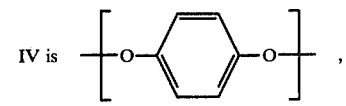, wherein the polyester comprises approximately 20 to 30 mole percent of moiety I, approximately 20 to 30 mole percent of moiety II, approximately 20 to 30 mole percent of moiety III, and approximately 20 to 30 mole percent of moiety IV, and wherein the total molar concentration of moieties I and III is substantially identical to the total molar concentration of moieties II and IV.

DESCRIPTION OF PREFERRED EMBODIMENTS

The melt processable polyester of the present invention consists essentially of four recurring aromatic moieties which are free of ring substitution and which when combined in the polyester as described hereafter have been found to form an optically anisotropic melt phase at a temperature below approximately 350° C., and preferably below approximately 340° C. (e.g. at approximately 310° to 340° C.). Such polyester is crystalline in nature. The polymer melting temperature may be confirmed by use of a differential scanning calorimeter (i.e. DSC) employing repeat scans at a 20° C. per minute heat up rate and observing the peak of the DSC melt transition. The crystalline polyester commonly exhibits a melting temperature of at least 305° C. as determined by differential scanning calorimetry. Because of its ability to exhibit anisotropic properties (i.e. liquid crystalline properties) in the melt, the polyester readily can form a product having a highly oriented molecular structure upon melt processing. Preferred polyesters are capable of undergoing melt processing at a temperature in the range of approximately 330° to 360° C. The usual difficulties incurred when one attempts to melt process many aromatic polyesters by conventional melt processing techniques effectively are eliminated. The polyester of the present invention is considered to be "wholly" aromatic in the sense that each moiety present in the same contributes at least one aromatic ring to the polymer backbone.

The first recurring unit (i.e. moiety I) of the polyester of the present invention is a 2,6-dicarboxynaphthalene moiety of the structural formula:

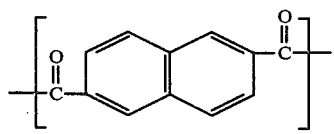

Moiety I is free of ring substitution and may be derived from 2,6-dicarboxynaphthoic acid. Moiety I is present in the polyester in a concentration of approximately 20 to 30 mole percent, and preferably in a concentration of approximately 25 mole percent.

The second recurring unit (i.e. moiety II) of the polyester of the present invention is a 2,6-dioxynaphthalene moiety of the structural formula:

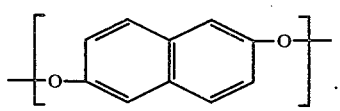

Moiety II is free of ring substitution and may be derived from 2,6-dihydroxynaphthalene. Moiety II is present in the polyester in a concentration of approximately 20 to 30 mole percent, and preferably in a concentration of approximately 25 mole percent.

The third recurring unit (i.e. moiety III) of the polyester of the present invention is a terephthaloyl moiety of the structural formula:

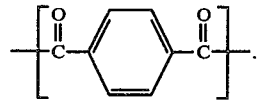

Moiety III is free of ring substitution and may be derived from terephthalic acid. Moiety III is present in the polyester in a concentration of approximately 20 to 30 mole percent, and preferably in a concentration of approximately 25 mole percent.

The fourth recurring unit (i.e. moiety IV) of the polyester of the present invention is a 1,4-dioxybenzene moiety of the structural formula:

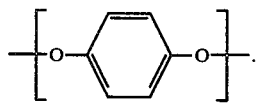

Moiety IV is free of ring substitution and may be derived from hydroquinone. Moiety IV is present in the polyester in a concentration of approximately 20 to 30 mole percent, and preferably in a concentration of approximately 25 mole percent.

The polyester of the present invention is free of moieties in the polymer chain which are derived from hydroxy acids. Additionally, the total molar concentration of moieties I and III is substantially the same as the total molar concentration of moieties II and IV.

The polyester of the present invention commonly exhibits

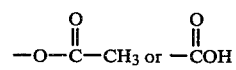

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

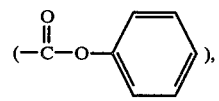

and methylester

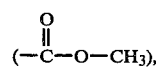

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The polyester of the present invention tends to be substantially insoluble in all common polyester solvents, such as hexafluoroisopropanol and o-chlorophenol, and accordingly are not susceptible to solution processing. It can surprisingly be readily processed by common melt processing techniques as discussed hereafter. Most compositions are soluble in pentafluorophenol.

The polyester of the present invention commonly exhibits a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infra red spectroscopy on compression molded films. Alternatively, light scattering techniques in a pentafluorophenol solution may be employed to determine the molecular weight.

The wholly aromatic polyester prior to heat treatment additionally commonly exhibits an inherent viscosity (i.e., I.V.) of at least approximately 3.5 (e.g., approximately 3.5 to 12) when dissolved in a concentration of 0.1 percent by weight in pentafluorophenol at 60° C.

The polyester of the present invention commonly may be considered crystalline in the sense that fibers melt extruded therefrom exhibit x-ray diffraction patterns using Ni-filtered CuK$\alpha$ radiation and flat plate cameras characteristic of polymeric crystalline materials. In spite of the crystallinity commonly observed, the wholly aromatic polyester of the present invention nevertheless may be easily melt processed in all instances.

Unlike the aromatic polyesters commonly encountered in much of the prior art, the polyester of the present invention is not intractable and forms an anisotropic melt phase whereby an atypical degree of order is manifest in the molten polymer. The subject polyester readily forms liquid crystals in the melt phase and accordingly exhibits a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow), however, the sample is optically anisotropic even in the static state.

The polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants wherein reactants such as terephthalic acid initially are present as solids with the reaction continuing as solid polymer particles are formed and suspended therein. A vacuum may be applied to facilitate removal of volatiles formed during the final stage of the condensation (e.g., acetic acid or water).

In commonly assigned U.S. Pat. No. 4,067,852 of Gordon W. Calundann, entitled "Melt Processable Thermotropic Wholly Aromatic Polyester Containing Polyoxybenzoyl Units" is described another slurry polymerization process which may be employed to form the polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which the 2,6-dioxynaphthalene moiety (i.e. moiety II) and the 1,4-dioxybenzene moiety (i.e. moiety IV) are derived may be initially provided in a modified form whereby the hydroxyl groups of these monomers are esterified (i.e., they are provided as acyl esters). The lower acyl groups preferably have from about 2 to about 4 carbon atoms. Preferably the acetate esters of the organic compounds which form moieties II, and IV are provided. Accordingly, particularly preferred reactants for the condensation reaction are 2,6-diacetoxy napthalene and hydroquinone diacetate.

Representative catalysts which optionally may be employed in either the melt hydrolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed polyester may be further increased via a solid state polymerization procedure wherein the particulate polymer is heated in an inert atmosphere (e.g. in a nitrogen atmosphere) at a temperature of about 290° C. for 10 to 12 hours.

The polyester of the present invention readily can be melt processed to form a variety of shaped articles, e.g., molded three-dimensional articles, fibers, films, tapes, etc. The polyester of the present invention is suited for molding applications and may be molded via standard injection molding techniques commonly utilized when forming molded articles. Unlike the polyesters commonly encountered in the prior art it is not essential that more severe injection molding conditions (e.g., higher temperature), compression molding, impact molding, or plasma spraying techniques be utilized. Fibers or films may be melt extruded.

A molding compound may be formed from the wholly aromatic polyester of the present invention which incorporates approximately 1 to 60 percent by weight of a solid filler (e.g. talc) and/or reinforcing agent (e.g. glass fibers).

The polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e. a slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 miles) may be utilized. Yarns of about 20 to 200 continuous filaments are commonly formed. The melt-spinnable polyester is supplied to the extrusion orifice at a temperature above its melting point, e.g., a temperature of about 330° to 360° C.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material or film optionally may be subjected to a thermal treatment whereby its physical properties are further enhanced. The tenacity of the fiber or film generally is increased by such thermal treatment. More specifically, the fibers or films may be thermally treated in an inert atmosphere (e.g., nitrogen, argon, helium) or in a flowing oxygen-containing atmosphere (e.g. air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 290° C. for 8 hours and at 320° C. for 2 hours. Alternatively, the fiber may be heated at about 15° to 20° C. below the temperature at which it melts for about 24 hours. Optimum heat treatment conditions will vary with the specific composition of the polyester and with the fiber's process history.

The as-spun fibers formed from the polyester of the present invention are fully oriented and exhibit highly satisfactory physical properties which render them suitable for use in high performance applications. The as-spun fibers commonly exhibit an average single filament tenacity of at least 5 grams per denier (e.g., about 5 to 15 grams per denier), and average single filament tensile modulus of at least about 300 grams per denier (e.g., about 300 to 1000 grams per denier), and exhibit an extraordinary dimensional stability at elevated temperatures (e.g., at temperatures of about 150° to 200° C.). Following thermal treatment (i.e., annealing) the fibers commonly exhibit an average single filament tenacity of at least 10 grams per denier (e.g., 10 to 30 grams per denier), and an average single filament tensile modulus of at least 300 grams per denier measured at ambient conditions (e.g. 72° F. and 65 percent relative humidity). Such properties enable the fibers to be used with particular advantage as tire cords and in other industrial applications, such as conveyor belts, hose, cabling, resin reinforcement, etc. Films formed of the polyester of the present invention may be used as strapping tape, cable wrap, magnetic tape, electric motor dielectric film, etc. The fibers and films exhibit an inherent resistance to burning. The absence in the polymer chain of moieties derived from hydroxy acids has been found to yield a highly linear more extended polymer chain along the polyester which contributes to the stiffness characteristics of shaped articles comprising the same. Also, it has been found that the polyester of the present invention forms a highly tractible melt phase even in the absence of ring substitution.

The following example is presented as a specific illustration of the claimed invention. It should be understood, however, that the invention is not limited to the specific details set forth in the example.

EXAMPLE

To a 300 ml. three-neck round bottom flask equipped with a paddle stirrer, gas inlet tube, and a distillation head connected to a condenser were added the following:

(a) 21.6 grams of 2,6-naphthalenedicarboxylic acid (0.1 mole), (b) 24.4 grams of 2,6-diacetoxynaphthalene (0.1 mole), (c) 16.6 grams of terephthalic acid (0.1 mole), (d) 19.4 grams of hydroquinone diacetate (0.1 mole), and (e) 0.02 grams of sodium acetate catalyst.

The flask was purged of oxygen by evacuation and refilling with argon three times, and was then heated in a silicone oil bath under a slow stream of argon.

While stirring continued the contents of the flask were heated to 250° C. The contents of the flask generally melted with the exception of the terephthalic acid reactant and formed a smooth opaque slurry. After heating for 20 minutes at 250° C., the flask was heated to 270° C. and acetic acid began to distill from the mixture. After heating for 20 minutes at 270° C., the temperature was raised to 280° C. and was held there for 20 minutes at the end of which time a total of 8.0 ml. acetic acid (35 percent theoretical) had distilled. The temperature was then raised to 320° C. and was held at 320° C. for 60 minutes. At the conclusion of this heating a total of 20 ml. acetic acid (87 percent theoretical) had distilled. The temperature was raised to 340° C. and was held at 340° C. for 20 minutes. A vacuum next was slowly applied to the contents of the flask to minimize foaming and a reduced pressure of 0.7 mm. Hg was achieved. The vacuum heating cycle lasted for 105 minutes, and the final volume of acetic acid collected was 21.0 ml. (92 percent theoretical). The product was a pale tan opaque viscous mass. The product was cooled to a solid mass while under the argon gas and was removed from the flask. The polymer was next ground to a fine powder in a Wiley mill.

The inherent viscosity (I.V.) of the polymer was approximately 8.6 as determined in a pentafluorophenol solution of 0.1 percent by weight concentration at 60° C. in accordance with the equation:

$$I.V = [\ln(\eta\ rel)]/c$$

where c=concentration of solution (0.1 percent by weight), and $\eta$ rel=relative viscosity. When the polymer was subjected to differential scanning calorimetry (20° C./min. heating rate), it exhibited a melt endotherm at about 332° C. The polymer melt was optically anisotropic.

The polymer was dried in a vacuum oven, and while molten and at a temperature of 360° C. was extruded through a single hole spinneret having a diameter of 0.007 inch at a throughput rate of 0.42 gram/minute. The as-spun filament was quenched in ambient air (i.e. at 72° F. and 65 percent relative humidity) prior to windup at a speed of 444 meters/minute.

A section of the resulting as-spun polyester fiber had a denier of 9.4 and exhibited the following single filament properties:

Tenacity (grams per denier): 8.8
Tensile modulus (grams per denier): 510
Elongation (percent): 2.5

A section of the resulting as-spun polyester was next heated in a relaxed state in a nitrogen atmosphere for 8 hours at 290° C. followed by 2 hours at 320° C. The properties of the sample following this heat treatment are reported below:

Tenacity (grams per denier): 14.0
Tensile modulus (grams per denier): 455
Elongation (percent): 3.4

Although the invention has been described with a preferred embodiment it is to be understood that variations and modifications may be employed without departing from the concept of the invention as defined in the following claims.

We claim:

1. A melt processable polyester capable of forming an anisotropic melt phase at a temperature below approximately 350° C. consisting essentially of the recurring moieties I, II, III, and IV which are free of ring substitution wherein:

I is 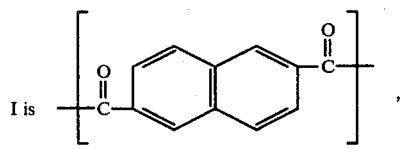

II is 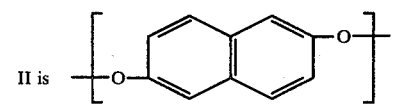

III is 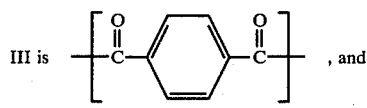, and

IV is 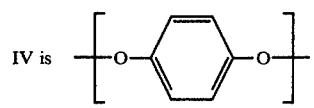, wherein said polyester comprises approximately 20 to 30 mole percent of moiety I, approximately 20 to 30 mole percent of moiety II, approximately 20 to 30 mole percent of moiety III, and approximately 20 to 30 mole percent of moiety IV, and wherein the total molar concentration of moieties I and III is substantially identical to the total molar concentration of moieties II and IV.

2. A melt processable polyester according to claim 1 which is capable of forming an anisotropic melt phase at a temperature below approximately 340° C.

3. A melt processable polyester according to claim 1 which is capable of exhibiting a differential scanning calorimeter melting temperature in the range of approximately 310° to 340° C.

4. A melt processable polyester according to claim 1 which exhibits an inherent viscosity of at least 3.5 when dissolved in a concentration of 0.1 percent by weight in pentafluorophenol at 60° C.

5. A melt processable polyester according to claim 1 which exhibits an inherent viscosity of approximately 3.5 to 12 when dissolved in a concentration of 0.1 percent by weight in pentafluorophenol at 60° C.

6. A fiber which has been melt spun from the polyester of claim 1.

7. A film which has been melt extruded from the polyester of claim 1.

8. A molded article comprising the polyester of claim 1.

9. A molding compound comprising the polyester of claim 1 which incorporates approximately 1 to 60 percent by weight of a solid filler and/or reinforcing agent.

10. A melt processable polyester capable of forming an anisotropic melt phase at a temperature below approximately 350° C. consisting essentially of the recurring moieties I, II, III, and IV which are free of ring substitution wherein:

I is 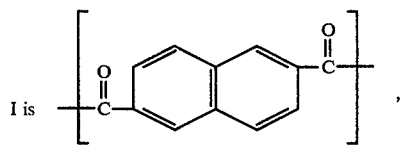,

II is 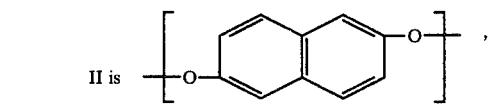,

III is 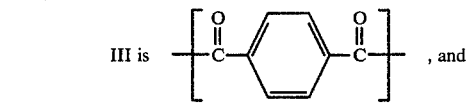, and

IV is 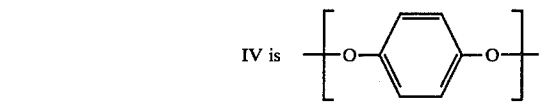, wherein said polyester comprises approximately 25 mole percent of moiety I, approximately 25 mole percent of moiety II, approximately 25 mole percent of moiety III, and approximately 25 mole percent of moiety IV.

11. A melt processable polyester according to claim 10 which is capable of forming an anisotropic melt phase at a temperature below approximately 340° C.

12. A melt processable polyester according to claim 10 which is capable of exhibiting a differential scanning calorimeter melting temperature in the range of approximately 310° to 340° C.

13. A melt processable polyester according to claim 10 which exhibits an inherent viscosity of at least 3.5 when dissolved in a concentration of 0.1 percent by weight in pentafluorophenol at 60° C.

14. A melt processable polyester according to claim 10 which exhibits an inherent viscosity of approximately 3.5 to 12 when dissolved in a concentration of 0.1 percent by weight in pentafluorophenol at 60° C.

15. A fiber which has been melt spun from the polyester of claim 10.

16. A film which has been melt extruded from the polyester of claim 10.

17. A molded article comprising the polyester of claim 10.

18. A molding compound comprising the polyester of claim 10 which incorporates approximately 1 to 60 percent by weight of a solid filler and/or reinforcing agent.

* * * * *